United States Patent
Watson

(10) Patent No.: US 10,647,522 B1
(45) Date of Patent: May 12, 2020

(54) OPTIMIZING GAP DISTANCE BETWEEN ITEMS ON A CONVEYOR SYSTEM

(71) Applicant: Amazon Technologies, Inc., Seattle, WA (US)

(72) Inventor: Benjamin James Christopher Watson, Hemel Hempstead (GB)

(73) Assignee: Amazon Technologies, Inc., Seattle, WA (US)

( * ) Notice: Subject to any disclaimer, the term of this patent is extended or adjusted under 35 U.S.C. 154(b) by 326 days.

(21) Appl. No.: 15/362,704

(22) Filed: Nov. 28, 2016

(51) Int. Cl.
*B65G 47/31* (2006.01)
*B65C 9/26* (2006.01)
*B65C 9/40* (2006.01)

(52) U.S. Cl.
CPC ............... *B65G 47/31* (2013.01); *B65C 9/26* (2013.01); *B65C 9/40* (2013.01)

(58) Field of Classification Search
CPC .... B65C 9/06; B65C 9/20; B65C 9/40; B65C 2009/41; B65G 47/30; B65G 47/31; B65G 47/32
See application file for complete search history.

(56) References Cited

U.S. PATENT DOCUMENTS

2006/0231209 A1* 10/2006 Smith ................. B65C 1/02
  156/542
2016/0263623 A1* 9/2016 Wojdyla .............. G06Q 10/083

\* cited by examiner

*Primary Examiner* — George R Koch
(74) *Attorney, Agent, or Firm* — Thomas Horstemeyer, LLP

(57) ABSTRACT

Embodiments of the disclosure are directed to a conveyor system that optimizes a gap between items. The gap is optimized to maximize throughput of the conveyor system with respect to bottlenecks in the conveyor system, such as label applicators that print and apply label to items that are being advanced through the conveyor system.

20 Claims, 8 Drawing Sheets

OPTIMIZING GAP DISTANCE BETWEEN ITEMS ON A CONVEYOR SYSTEM

BACKGROUND

Packages shipped from a fulfillment center, warehouse, or the like can be packed and placed onto a conveyor system to prepare them for shipment. Once on the conveyor system, the packages can be weighed and a shipping label applied to the package for shipment. In modern fulfillment center environments, a shipping label can be printed and applied by automated machinery. In some environments, shipping labels are applied to packages in pairs. In other words, two packages can enter a shipping label applicator via conveyors sequentially, and the label applicator has two tamp heads that apply respectively labels to the respective packages. Maximizing throughput and reducing bottlenecks within such a system.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Embodiments of the present disclosure are directed to moving items, such as packages in a fulfillment center or inventory in a warehouse, through a conveyor system. In one example, embodiments of the disclosure are directed to moving items down a conveyor system that includes multiple conveyors and to a label applicator that is integrated into the conveyor system. The label applicator can print and/or apply a label, such as a shipping label, to items that enter the label applicator. The label applicator can then move the items downstream into the conveyor system once the label is applied to other systems within the conveyor system. In many cases, a label applicator can be considered a bottleneck in the system. Throughput of the conveyor system can be limited by the maximum throughput of the label applicator. However, in many implementations of a conveyor system that includes a label applicator, the conveyor system is not configured in an optimized manner to ensure that the maximum or close-to-maximum throughput of the label applicator is taken advantage of. As a result, the throughput of the entire conveyor system can suffer.

Accordingly, the conveyor system can be configured with multiple conveyors that have one or more photodetectors that facilitate gap detection between the items on the conveyor system. To maximize throughput a desired gap between items on the conveyor system is maintained on the conveyors that feed the label applicator. The desired gap can be selected so that the throughput of the label applicator that is downstream from the conveyors (or throughput of any other bottleneck of the conveyor system) is maximized. In the context of this disclosure, a label applicator represents a device that can print and apply a label, such as a shipping label, to an item. An item can be a box, parcel, or any other item to which a label can be applied. The label can be an adhesive label that is printed by a printer and applied by tamp heads or any other device that can mechanically apply a label to the item.

Figure 1A:
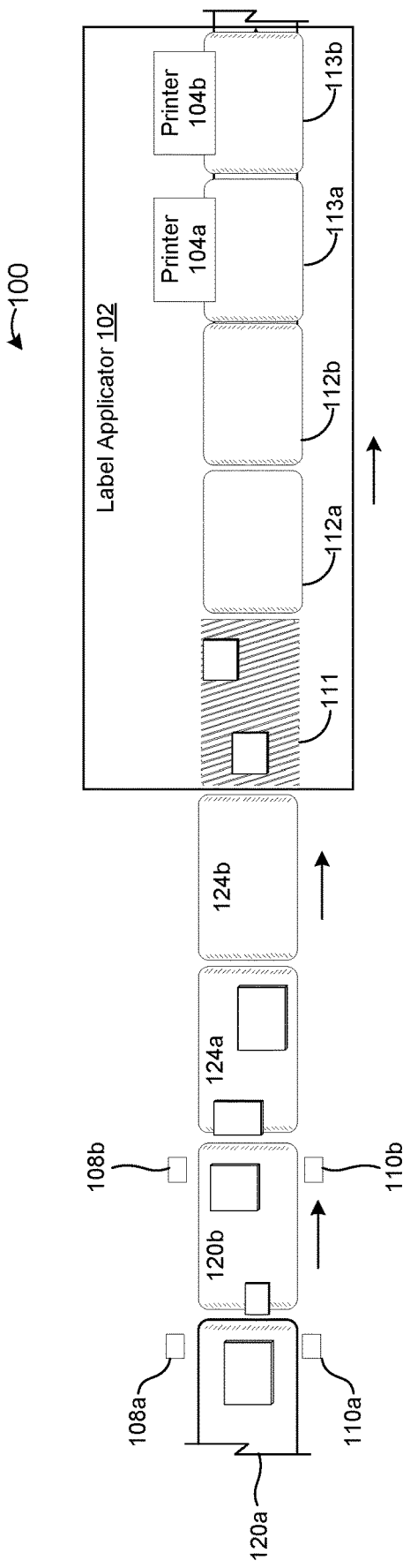
FIG. 1A is a drawing of an example conveyor system according to embodiments of the disclosure.

Reference is now made to FIG. 1A, which illustrates an example of a conveyor system 100 according to embodiments of the disclosure. The conveyor system 100 can include various conveyors that are arranged in a sequential manner. In some examples, the conveyors in the conveyor system 100 can be monitored and controlled by a controller or processor running software that processes inputs from personal and input devices associated with the conveyor system 100. The controller can adjust the relative or absolute velocities of the conveyors to adjust the gaps between items that on the conveyor system 100.

In the example of FIG. 1A, the conveyor system 100 includes a label applicator 102, one or more gapping conveyors 120a, 120b, and one or more transportation conveyors 124a, 124b. The label applicator 102 can include a skew conveyor 111 and one or more applicator conveyors 112a, 112b that receive items within the label applicator 102 from the skew conveyor 111 and further adjust the gap between items so that a label can be applied to respective pairs of items on the conveyor system. The gapping conveyors 120 are depicted as two conveyors, but the conveyor system 100 can also include a larger set of gapping conveyors 120. In many implementations, more gapping conveyors 120 are used. The two gapping conveyors 120 shown in FIG. 1A is merely for ease of depiction of the various zones and types of conveyors that can be included within a conveyor system 100. The purpose of the gapping conveyors is to adjust and/or maintain a desired gap between items on the conveyor system. The desired gap that is reached and/or adjusted on the gapping conveyors 120 can be selected so that once a pair of items enter the label applicator 102, the gap between items is less than the gap or distance between can the printers 104a and 104b within the label applicator 102. The transportation conveyors 124 can be an optional component of the conveyor system 100 and might also be configured as gapping conveyors 120. The transportation conveyors 124 can transport items along the conveyor system 100 in an axis of travel towards the label applicator 102. In some examples, there might be other transportation conveyors 124 located upstream from the gapping conveyors 120.

For example, transportation conveyors 124 can be positioned upstream from the gapping conveyors 120 in a loading area where items are loaded onto the conveyor system 100 by workers or other machinery. These upstream transportation conveyors 124 can transport items loaded onto the conveyor system 100 to the gapping conveyors 120, which can adjust the gap between items to achieve a desired gap. The items can then be transported to the label applicator 102, which can apply labels to the items and continue transport of the items downstream.

The skew conveyor 111 can align items that enter the label applicator 102 along an axis of travel of the conveyor system 100 so that the items are aligned with tamp heads of the printer 104 that press or apply labels to the items entering the label applicator 102. In one example, the skew conveyor 111 can comprise a conveyor that includes rollers angled in a certain direction relative to the axis of travel of the conveyor system 100 while the gapping conveyors 120 and transportation conveyors 124 can be configured as belt conveyors.

In some examples, the applicator conveyors 112, or a controller in communication with the label applicator 102, can adjust the gap between pairs of items that enter the label applicator 102 to match the distance between tamp heads of the printers 104a and 104b. In some examples of a label applicator 102, the applicator conveyors 112 are only configured with the ability to increase the gap between pairs of items that enter the label applicator 102. Accordingly, by maintaining a desired gap on the gapping conveyors 120, or within the gapping zone, that is less than the distance between the tamp heads of the printers 104, the label applicator 102 can upwardly adjust the gap between the items to this distance. Accordingly, the risk of items entering the label applicator 102 with a gap that exceeds the distance between the tamp heads is reduced, which can increase the throughput of label applicator 102. If the distance between pairs of items entering the label applicator 102 exceeds this distance, the label applicator 102 or a controller managing the conveyor system 100 might have to signal upstream conveyors to stop or slow down while the label applicator 102 applies labels to both items in a pair of items.

Printer conveyors 113a and 113b can receive items from the applicator conveyors 112 and transport the items to the printers 104a and 104b. In some examples, the printer conveyors 113a and 113b can be implemented as a single conveyor because they do not require the ability to adjust a gap between items, as the gap can be adjusted by the applicator conveyors 112.

The gap between items on the gapping conveyors 120 can be detected by a gap detection mechanism that can be integrated with the gapping conveyors 120. In some examples, the gap detection mechanism can be an external device that communicates with a controller of the conveyor system. In the example of FIG. 1A, emitters 108a, 108b can be positioned along the gapping conveyors 120. The emitters 108 can emit a light source, such as a laser, towards respective photodetectors 110a and 110b. Additionally, each gapping conveyor 120 can be outfitted with two or more pairs of photodetectors 110 and emitters 108 for more granular gap detection.

As an item moves down the conveyor system 100, when the leading edge of the item obstructs or breaches a light source from a respective emitter 108 to a respective photodetector 110, a gapping conveyor, or a controller in communication with the gapping conveyor 120, can determine the gap between the item the next item on the gapping conveyor 120. The distance can be determined because the controller controls the velocity of the gapping conveyor 120 and can determined the elapsed time until the next item breaches the light source from the same emitter 108 to the same photodetector 110. If the gap between the items on the gapping conveyor 120 is less than or greater than a desired gap, a controller can adjust the relative velocities of adjacent gapping conveyors 120 to adjust the gap between the items.

Figure 1B:
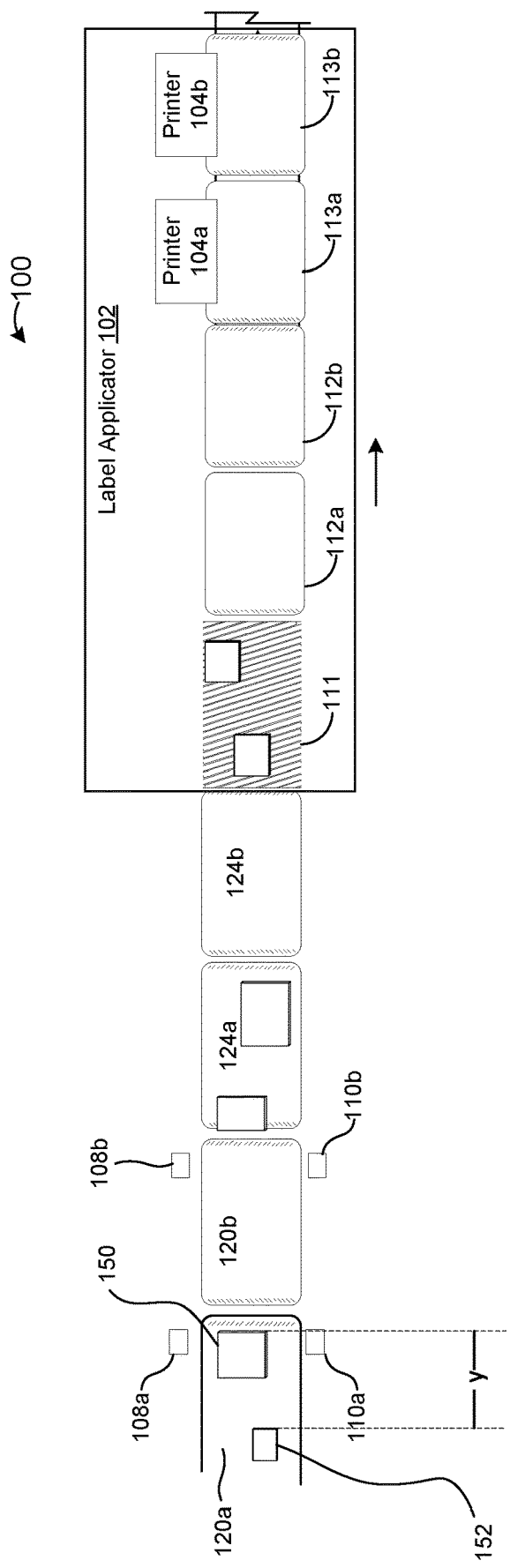
FIG. 1B is a drawing of an example conveyor system according to embodiments of the disclosure.

Reference is now made to FIG. 1B, which illustrates an alternative view of the conveyor system 100 according to an example of the disclosure. As illustrated in FIG. 1B, items 150 and 152 are on the gapping conveyor 120a. In the example of FIG. 1B, a controller can determine from the photodetector 110a and emitter 108a, as the items breach the light source, the gap between the items. Accordingly, if the gap distance y is less than a desired gap, a controller can alter the velocity of one or both of the gap conveyor 120a or 120b so that the relative velocity of gap conveyor 120b is greater than gap conveyor 120a. If the gap distance y is greater than a desired gap, the controller can reduce the relative velocity of gap conveyor 120b to gap conveyor 120a to reduce the gap to the desired gap.

Figure 1C:
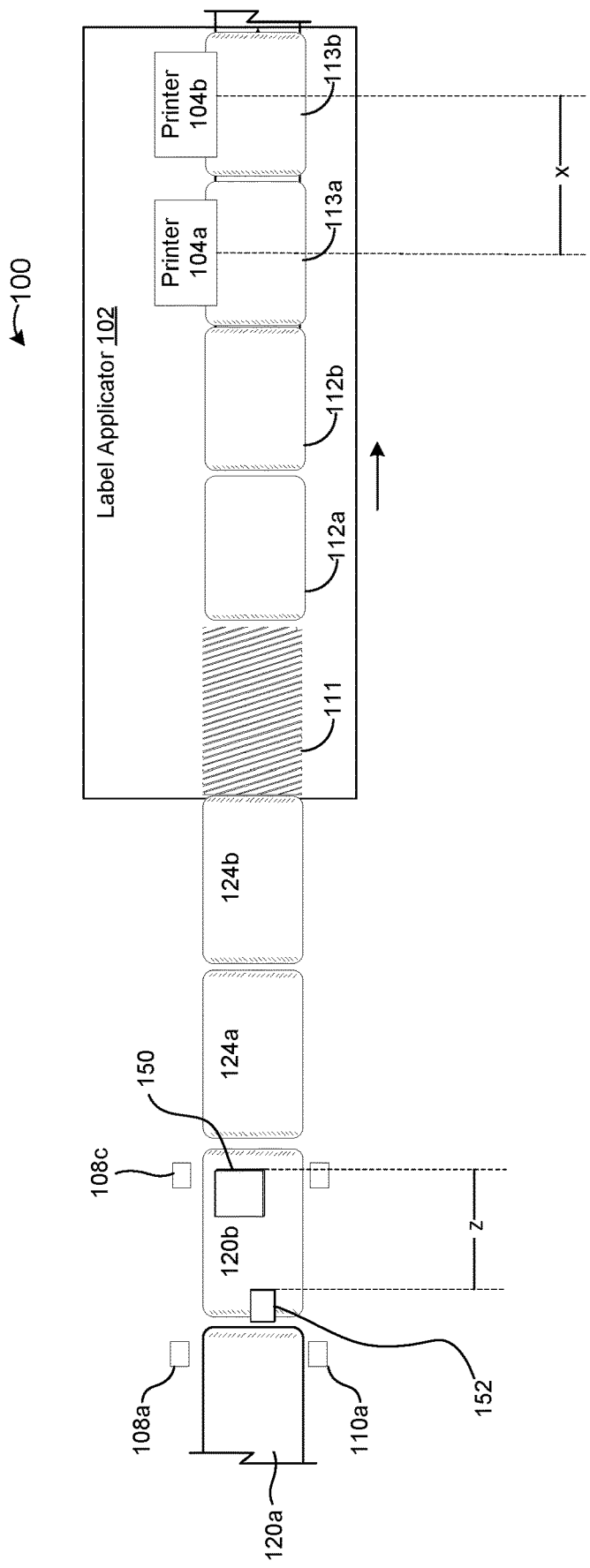
FIG. 1C is a drawing of an example conveyor system according to embodiments of the disclosure.

Continuing this example, reference is now made to FIG. 1C. In FIG. 1C, the controller has adjusted the gap between the items 150 and 152 to a desired gap distance z by altering the relative velocities of gapping conveyors 120a and 120b. In some examples, the controller can also alter the relative velocity of gapping conveyor 120b and transportation conveyor 124a to make an additional gap adjustment between items. In some examples, all of the conveyors leading up to the skew conveyor can be configured as gapping conveyors 120. The desired gap distance z is less than the distance x between the tamp heads of the printers 104 of the label applicator 102. In some examples, the desired gap distance y on the gapping conveyors 120 and transportation conveyors 124 leading to the skew conveyor 111 can be approximately ten to fifteen percent less than the distance x. In this way, the applicator conveyors 112a and 112b can adjust the gap between items entering the label applicator 102 to match the distance x without signaling upstream conveyors to halt or slow down. In other words, because the applicator conveyors 112a and 112b would only increase the gap between items rather than reduce the gap between items entering the label applicator 102, slowing down upstream conveyors would be unnecessary to accommodate the applying of labels to items. This results in a more optimized operation of the conveyor system and higher throughput of the label applicator 102.

In one example, the distance between the tamp heads is approximately 900 mm. In this scenario, the desired gap maintained on the gapping conveyors 120 can be approximately 800 mm. The distance between the tamp heads can vary, and the distance between the tamp heads determines the desired gap maintained on the gapping conveyors 120. Accordingly, the desired gap can be maintained at a distance that is less than the distance between the tamp heads.

Figure 1D:
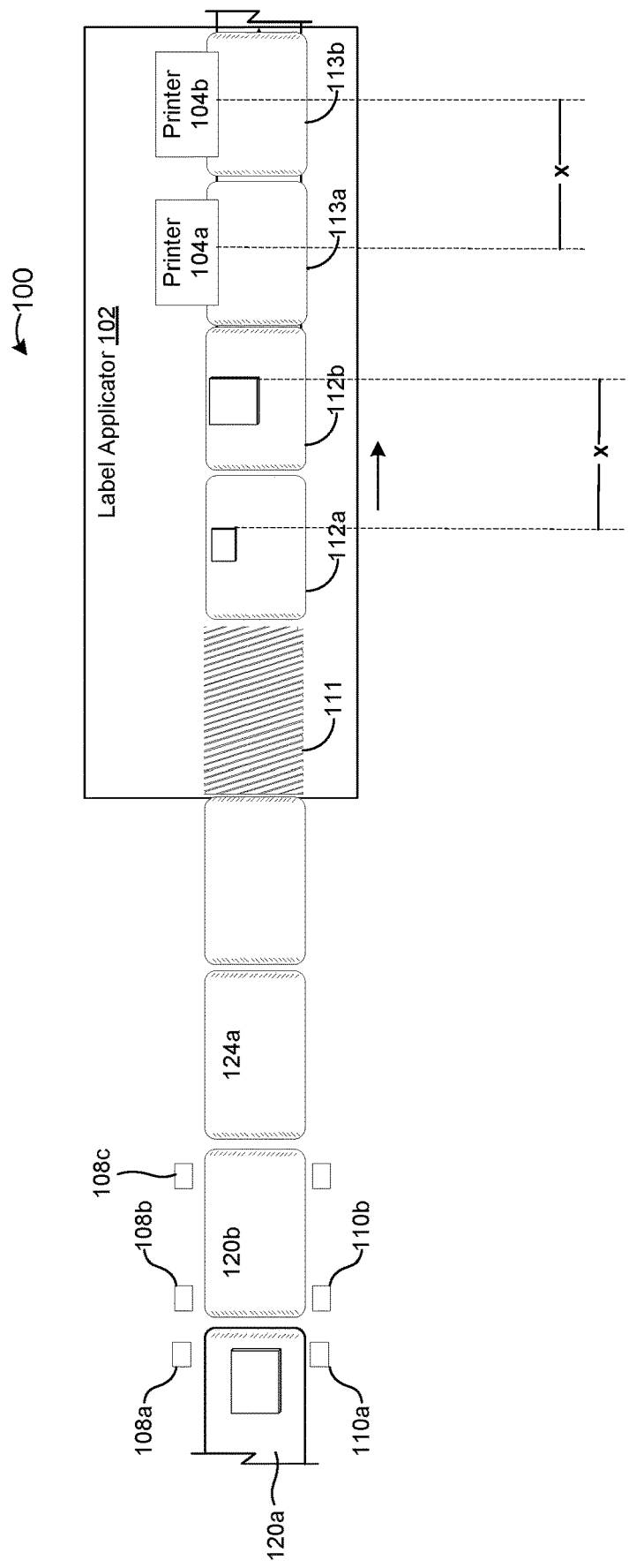
FIG. 1D is a drawing of an example conveyor system according to embodiments of the disclosure.

Referring now to FIG. 1D, the items 150 and 152 have traversed the transportation conveyors 124a and 124b and have been aligned by the skew conveyor 111. The skew conveyor 111 can transport items along an axis of travel of the conveyor system 100 as well as perpendicular to the axis of travel so that an edge of the items are aligned as they enter the applicator conveyors 112a and 112b. In some examples, before the items enter the label applicator 102 or once the items enter the label applicator 102, an item identifier or shipment identifier can be scanned or detected by a barcode scanner, an RFID scanner, or other detection device. Once the item identifier is detected, a controller can cause the printers 104 to print a label that corresponds to the item. In some examples, the label can be an adhesive label and is applied to the items 150 and 152 by tamp heads within the label applicator 102.

In some examples, the applicator conveyors 112a and 112b can be outfitted with gap detection mechanisms and adjust the gap between the items 150 and 152 on the applicator conveyors 112a and 112b so that the gap is equal or substantially equivalent to the distance x between the tamp heads of the printers 104.

Figure 1E:
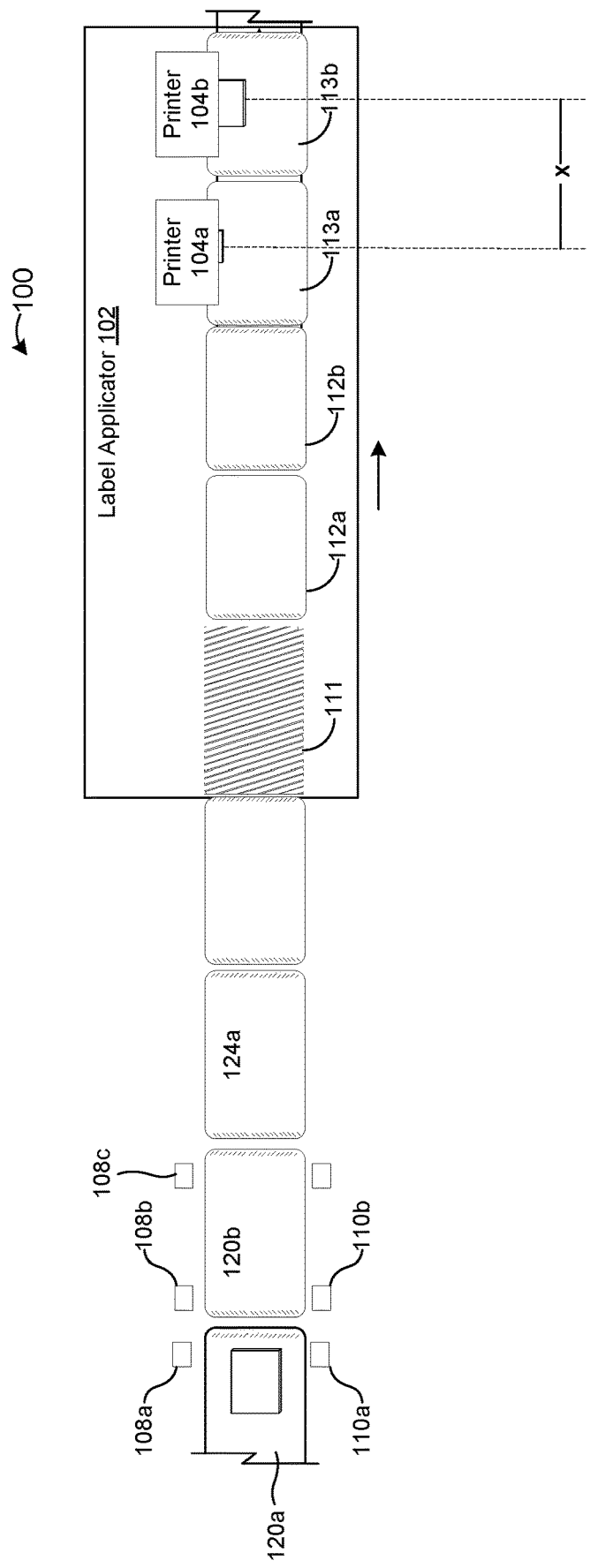
FIG. 1E is a drawing of an example conveyor system according to embodiments of the disclosure.

Referring now to FIG. 1E, the applicator conveyors 112 can transport the items 150 and 152 downstream to the printer conveyors 113. The printer conveyors 113 can transport the items 150 and 152 to the printers 104, where the tamp heads of the printers 104 can apply labels to the items 150 and 152. Once the printers 104 apply labels to the items 150 and 152, the items 150 and 152 can be moved downstream from the label applicator 102 by the printer conveyors 113.

In one configuration of the conveyor system 100, the controller can put the gapping conveyors 120 into a gap detection mode in which they are detecting the presence of items and adjusting the relative velocities of the respective gapping conveyors 120. In one example, each of the gapping conveyors 120 can be configured with a nominal speed of 140 feet per minute (fpm), a maximum speed of 160 fpm and a minimum speed of 120fpm. In other words, assuming the gap between items on the gapping conveyors 120 is consistent with or within an acceptable margin of the desired gap, the speed of the gap conveyors is 140 fpm. If the gap between items varies from the desired gap, the speed of the gapping conveyors 120 can range from 120 fpm to 160 fpm.

In this example, the transportation conveyors 124 can be configured with a velocity of 140 fpm, which is the nominal speed of the gapping conveyors 120. The skew conveyor 111 can be configured with a speed of 160 fpm. The applicator conveyors 112 can also be configured with a nominal speed of 160 fpm. The applicator conveyors 112 can also vary their relative velocity with respect to one another to adjust the gap between items entering the label applicator 102 to the distance between the printer 104 tamp heads.

As a more general example, the nominal speed of the gapping conveyors 120 and any transportation conveyors 124 employed within the conveyor system 100 that are upstream from the label applicator 102 can be configured so that it is less than the speed of the conveyors within or associated with the label applicator 102. In this way, the conveyors within or associated with the label applicator 102 will not require the upstream conveyors to slow or halt in order to accommodate the printing or applying of a label onto an item. Slowing or halting upstream conveyors can negatively affect throughput of the system.

Figure 2:
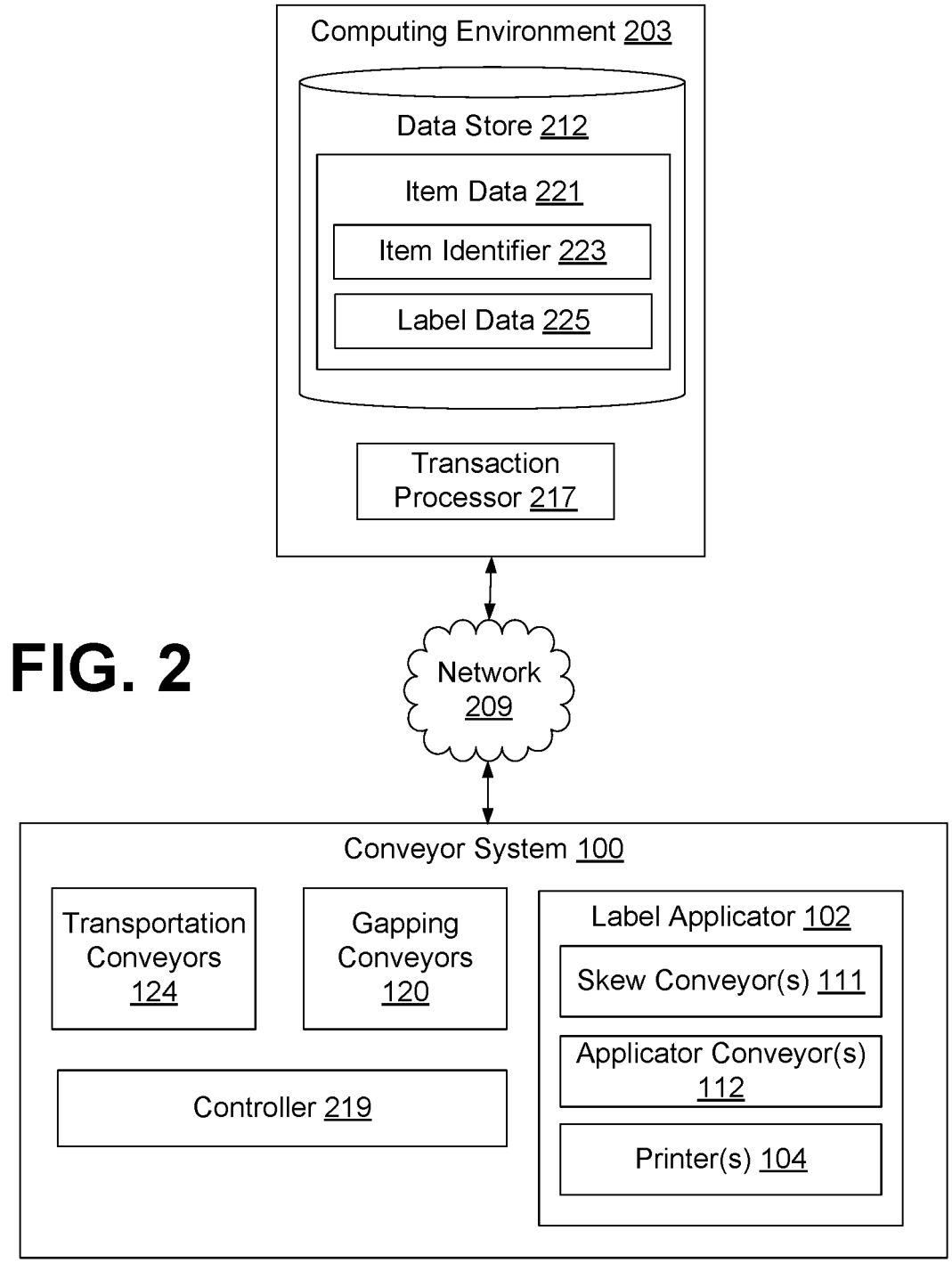
FIG. 2 is a drawing of a networked environment according to embodiments of the disclosure.

With reference to FIG. 2, shown is a networked environment 200 according to various embodiments. The networked environment 200 includes a computing environment 203 and the conveyor system 100 in data communication via a network 209. The network 209 includes, for example, the Internet, intranets, extranets, wide area networks (WANs), local area networks (LANs), wired networks, wireless networks, or other suitable networks, etc., cable networks, satellite networks, or any combination of two or more such networks.

The computing environment 203 can comprise, for example, a server computer or any other system providing computing capability. Alternatively, the computing environment 203 can employ a plurality of computing devices that can be arranged, for example, in one or more server banks, computer banks, or other arrangements. Such computing devices can be located in a single installation or may be distributed among many different geographical locations. For example, the computing environment 203 can include a plurality of computing devices that together can comprise a hosted computing resource, a grid computing resource, and/or any other distributed computing arrangement. In some cases, the computing environment 203 can correspond to an elastic computing resource where the allotted capacity of processing, network, storage, or other computing-related resources may vary over time.

Various applications and/or other functionality can be executed in the computing environment 203. Also, various data is stored in a data store 212 that is accessible to the computing environment 203. The data store 212 can be representative of a plurality of data stores 212. The data stored in the data store 212, for example, is associated with the operation of the various applications and/or functional entities described below.

The components executed on the computing environment 203, for example, include a transaction processor 217 and other applications, services, processes, systems, engines, or functionality not discussed in detail herein. The transaction processor 217 can process transactions related to items that can be handled within the conveyor system. In one example, the transaction processor 217 can process purchase transactions for products that are purchased by a user from an electronic marketplace. The products can be picked and placed into parcels. The parcels can then be injected into the conveyor system 100 as items, where a shipping label is applied by the label applicator 102 to prepare the parcel for shipment to a user. In this scenario, the transaction processor 217 can initiate purchase transactions on behalf of a user and determine appropriate data that should be placed onto a label that is subsequently applied to the parcel.

The data stored in the data store 212 includes, for example, item data 221 and other data that is not depicted that facilitates functioning of the transaction processor 217. Item data 221 includes information about items handled by the conveyor system, such as parcels that are shipped from a fulfillment center. An item identifier 213 can be associated with each item. The item identifier 213 can represent a numeric or alphanumeric identifier that can be applied to an item that is injected into the conveyor system 100. The item identifier 223 can be embedded within a barcode applied to an item so that, as the item enters the label applicator 102, the controller 219 and/or transaction processor 217 can identify the appropriate label that should be printed and applied to the item.

Label data 225 includes data from which a label that can be printed and applied by the label applicator 102 is generated. Label data 225 can include a printable representation of a label or data with which a label template can be populated by the transaction processor 217 or another process. In the case of a shipping label, the label data 225 can include a shipping address associated with a package, a shipment identifier, tracking information, or any other information that can be applied to a shipping label. The label data 225 can be generated by the transaction processor 217 once a transaction is processed. For example, when an order is placed by a customer, label data 225 can be generated and associated with an item identifier 223 corresponding to the user's order. Once the shipment is prepared and injected into the conveyor system 100, the item identifier 223 can be affixed to the parcel by a worker or machine and includes the item identifier 223 the shipping label can be retrieved and printed by the label applicator 102.

As introduced above, the conveyor system 100 can represent a portion of a fulfillment center or warehouse in which items are processed, shipped, received, or otherwise handled. Items, such as packages or parcels, can be injected into the conveyor system 100 upstream from the label applicator 102. An item can be transported downstream in the conveyor system 100 and to the label applicator 102, which can apply an appropriate label to the item.

The conveyor system 100, as described above, can include various elements and various types of conveyors. The conveyor system 100 can include one or more transportation conveyors 124. Transportation conveyors 124 can operated to transport items from one location within the conveyor system 100 to another location within the conveyor system 100. Transportation conveyors 124 can be positioned upstream or downstream from skew conveyors 111, gapping conveyors 120 and/or the label applicator 102. In some embodiments of the disclosure, transportation conveyors needed not be included in the conveyor system 100, as all conveyors of the conveyor system 100 can be implemented as a skew conveyor 111 or gapping conveyor 120.

Gapping conveyors 120 can include one or more conveyors that are upstream from the skew conveyor 111 and label applicator 102. The gapping conveyors 120 can include one or more conveyors can have a gap detection mechanism that detects the gap between items that are on the gapping conveyors 120. The gapping conveyors 120 can be arranged sequentially as a set of gapping conveyors 120 that operate to detect and adjust the gap between items to a desired gap.

One or more skew conveyors 111 can be upstream from the label applicator 102. The skew conveyor 111 can operate to align an edge of each item as it approaches the label applicator 102 along an axis of travel of the conveyor system 100. For example, the skew conveyor 111 can align a side edge of each item with a side of the conveyor system so that each item is in turn aligned with the tamp heads within the label applicator 102. Alignment of each item by the skew conveyor 111 can ensure that the label is applied consistently to each item by the label applicator 102. In some examples of this disclosure, the skew conveyor 111 can be considered as integrated within the label applicator 102. In other examples, the skew conveyor 111 is a separate upstream device.

The label applicator 102 can include a device or apparatus that can print or obtain a label and apply the label, such as an adhesive label, to items that are transported by the conveyor system 100 to the label applicator 102. The label applicator 102, in some examples, can include multiple printers and multiple tamp heads that are arranged sequentially within the conveyor system 100. Accordingly, if the label applicator 102 includes two printers 104 with two tamp heads, the label applicator can accept two items from the skew conveyor 111 and apply a label to each item before transporting the item downstream in the conveyor system 100.

The label applicator 102 can also include one or more applicator conveyors 112. The applicator conveyors 112 can accept items from the skew conveyor 111, adjust a gap between the items so that the gap matches the distance between the printer 104 tamp heads, and transport the items to the printer conveyors 113. In some scenarios, such as times of low item volume within the conveyor system 100, the label applicator 102 might only utilize one tamp head at a time rather than apply more than one label at a time to multiple items.

The controller 219 can represent a processor, computing device, integrated circuit, or software executed by any of the above, that controls the functioning of the conveyor system 100. In some implementations, the controller 219 is implemented in the computing environment 203 can interacts with components of the conveyor system 100 over the network 209. In another implementation, a single overarching controller 219 may not be implemented. Instead, each controller can be separately configured. For example, each of the gapping conveyors 120 can be configured with an appropriate nominal speed, maximum speed, minimum speed, and desired gap distance. Additionally, the applicator conveyors 112 and skew conveyors 111 can be configured with specific speed and gap parameters.

The controller 219 can set the speeds of the various conveyors in the conveyor system 100 based upon input from the gap detection mechanisms of the gapping conveyors 120 and/or applicator conveyors 112. The controller 219 can also interact with the printer 104 to initiate printing of an appropriate label that the tamp head of the printers 104 can apply to an item that enters the label applicator 102.

In one implementation of this disclosure, the controller 219 can be configured to adjust the relative velocities of each of the gapping conveyors 120 to maintain a desired gap between items as they enter and/or exit the gapping conveyors 120. For example, if the desired gap between two items is less than the desired gap, or if the items are too close to one another, the relative velocity of a downstream gapping conveyor 120 to an adjacent upstream gapping conveyor 120 can be increased to increase the gap to the desired gap.

Conversely, if the desired gap between two items is greater than the desired gap, or if the items are too far apart from one another, the relative velocity of the downstream gapping conveyor 120 to an adjacent upstream gapping conveyor 120 can be increased to decrease the gap to the desired gap. In some implementations, if the gap between items is greater than a threshold, the controller 219 can avoid adjusting the gap. In this scenario, the conveyor system 100 may be experiencing low item volume such that maintaining the desired gap between items is unnecessary or unwarranted. This threshold can be thought of or termed the gap ignore threshold.

The desired gap maintained by the gapping conveyors 120 can be selected at a distance that is less than the distance between the tamp heads of the printers 104. The reasoning behind selecting such a desired gap is that the label applicator 102, at maximum throughput, can receive pairs of items (or a quantity of items corresponding to the quantity of tamp heads in the label applicator 102) and apply a label to each item substantially simultaneously. Accordingly, the applicator conveyors 112 can be configured by the controller 219 to adjust their relative velocities to achieve a gap between pairs of items entering the label applicator 102 that corresponds to the distance between the tamp heads. By selecting a desired gap in the gapping conveyors 120 that is less than this distance, the applicator conveyors 112 can deliver items to the printers 104 at optimum throughput, thereby maximizing throughput of the overall conveyor system 100.

Figure 3:
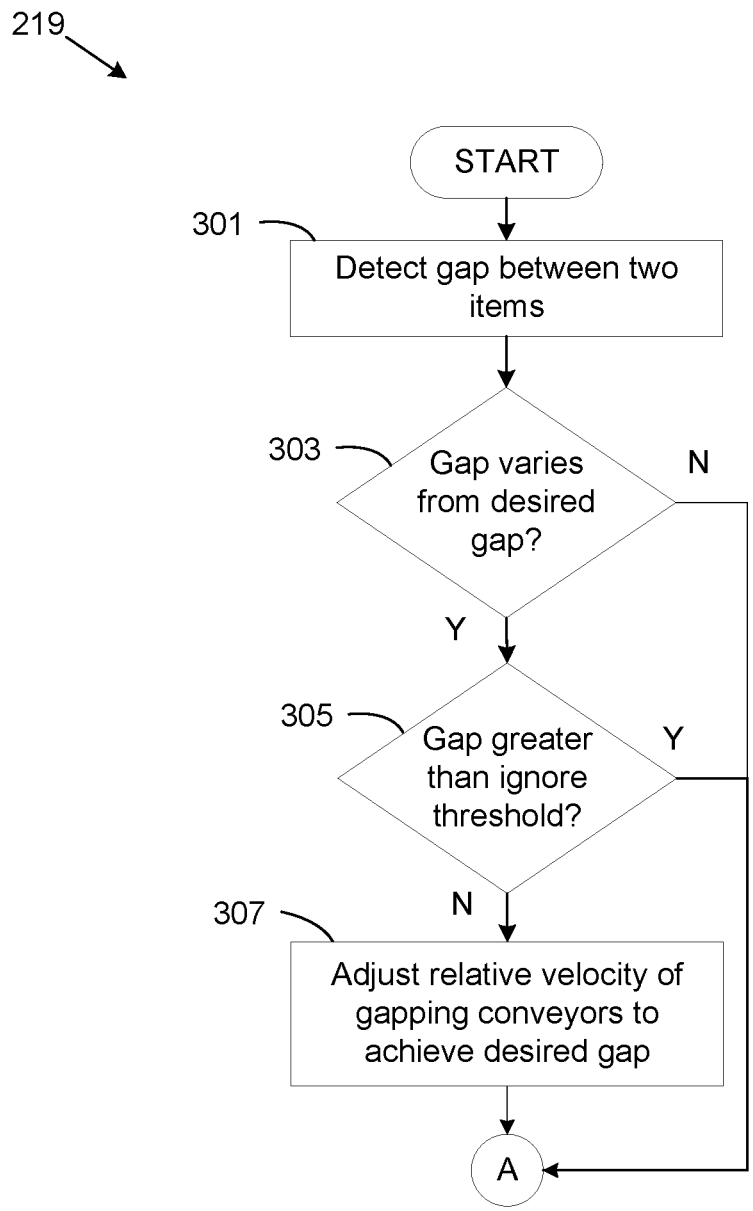
FIG. 3 is a flowchart illustrating an example method according to embodiments of the disclosure.
Figure 4:
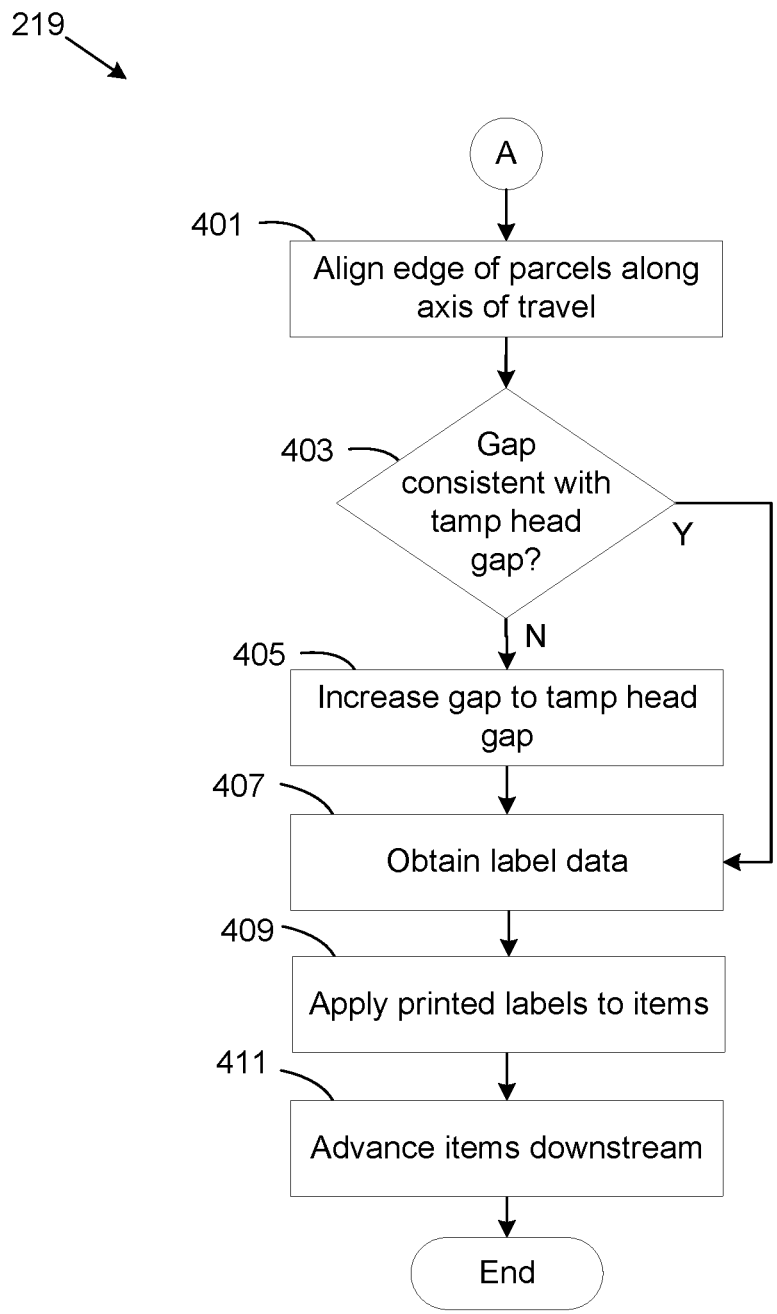
FIG. 4 is a flowchart illustrating an example method according to embodiments of the disclosure.

Referring next to FIGS. 3-4, shown is a flowchart that provides one example of operation of the controller 219 according to embodiments of the disclosure. The method shown in FIGS. 3-4 can be executed by a computing environment 203 in communication with the conveyor system 100 and its respective conveyors over a network 209. Alternatively, the flowchart of FIGS. 3-4 can also reflect a method that can be implemented by the conveyor system 100.

Beginning with box 301, the gap between items on one or more gapping conveyors 120 of the conveyor system 100 can be detected. The conveyor system 100 can include a set of any number of gapping conveyors 120 that are sequentially oriented with respect to one another. Each of the gapping conveyors 120 can be equipped with one or more gap detection mechanisms. As described above, the gapping conveyors 120 can be configured to maintain a desired gap between items that are received from upstream conveyors. To achieve a desired gap, the relative velocity of conveyors can be adjusted with respect to one another to increase, decrease, or maintain the desired.

At box 303, the controller 219 can determine whether the desired gap between two items on the gapping conveyors 120 varies from the desired gap distance using the gap detection mechanisms of the gapping conveyors 120. If the gap varies from the desired gap, the process can proceed to box 305. At box 305, the controller 219 can determine whether the gap is greater than the gap ignore threshold. If the gap between the items on the gapping conveyors are greater than the gap ignore threshold, the process proceeds to the remainder of the flowchart in FIG. 4. Similarly, if at box 303 the gap does not vary from the desired gap by a threshold amount, the process can also proceed to the remainder of the flowchart in FIG. 4.

Otherwise, the process can proceed to box 307. At box 307, the controller can adjust the relative velocity of adjacent gapping conveyors 120 to adjust the gap to the desired gap. If the gap is greater than the desired gap but not greater than the gap ignore threshold, the relative velocity of a subsequent gapping conveyor 120 can be increased relative to a previous gapping conveyor 120. If the gap is less than the desired gap, the relative velocity of a subsequent gapping conveyor 120 can be increased relative to a previous gapping conveyor 120. Thereafter, the process can proceed to FIG. 4.

At box 401 in FIG. 4, the parcels have advanced from the gapping conveyors 120 to the skew conveyor 111. At box 401, the skew conveyor 111 can align an edge, such as the side edge, or parcels along an axis of travel. Next, at box 403, the parcels have advanced from the skew conveyor 111 to the applicator conveyors 112. At box 403, the controller 219 can determine whether the gap between items entering the label applicator 102 is consistent with the distance between the tamp heads of the printers 104. If the gap is inconsistent with the distance between the tamp heads, the process to box 405, where the relative velocity of the applicator conveyors 112 can be adjusted to increase the gap between the items. Otherwise, the process proceeds from box 403 to box 407.

At box 407, the controller can obtain label data 225 corresponding to the items within the label applicator 102. At box 409, the controller can initiate printing of the labels by the printers 104 and application of the labels to the items by the tamp heads of the printers 104 within the label applicator 102. At box 411, the label applicator can advance the items downstream within the conveyor system 100. Thereafter, the process proceeds to completion.

The flowcharts of FIGS. 3-4 show the functionality and operation of an implementation of portions of the controller 210 or conveyor system 100. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a computer system or other system. The machine code may be converted from the source code, etc. If embodied in hardware, each block may represent a circuit or a number of interconnected circuits to implement the specified logical function(s).

Although the flowcharts of FIGS. 4-5 show a specific order of execution, it is understood that the order of execution may differ from that which is depicted. For example, the order of execution of two or more blocks may be scrambled relative to the order shown. Also, two or more blocks shown in succession in FIGS. 4-5 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A conveyor system comprising:
    a plurality of gapping conveyors, the plurality of gapping conveyors configured to receive a plurality of items placed on the conveyor system, each of the plurality of gapping conveyors having a photodetector configured to detect a gap between respective items on a respective one of the plurality of gapping conveyors;
    a skew conveyor configured to receive the plurality of items from the plurality of gapping conveyors, the skew conveyor aligning the plurality of items along an axis of travel within the conveyor system;
    a label applicator configured to apply labels to respective items on the conveyor system, the label applicator comprising a first tamp head and a second tamp head spaced a first distance apart;
    a first applicator conveyor and a second applicator conveyor associated with the label applicator, wherein the first applicator conveyor receives the plurality of items from the skew conveyor and the second applicator conveyor receives the plurality of items from the first applicator conveyor; and at least one controller in communication with the plurality of gapping conveyors, the first applicator conveyor and the second applicator conveyor, the at least one controller configured-to at least:

identify a desired gap associated with the plurality of items when two of the items are on a respective one of the plurality of gapping conveyors, the desired gap being less than the first distance between the first tamp head and the second tamp head;

identify a gap between the two of the items based upon feedback from the photodetector corresponding to the respective one of the plurality of gapping conveyors; and adjust a relative speed of the gapping conveyors to achieve the desired gap in response to determining that the gap between the two of the items varies from the desired gap.

2. The conveyor system of claim 1, wherein the skew conveyor is configured to shift the plurality of items to a first side of the skew conveyor parallel to the axis of travel.

3. The conveyor system of claim 1, wherein the at least one controller is further configured to adjust a relative speed of the first applicator conveyor and the second applicator conveyor to adjust the gap between the two of the items to the first distance between the first tamp head and the second tamp head.

4. The conveyor system of claim 1, wherein the at least one controller is further configured to identify a gap threshold that is greater than the first distance between the first tamp head and the second tamp head and avoid adjusting the relative speed of the gapping conveyors when the gap meets or exceeds the gap threshold.

5. The conveyor system of claim 1, wherein the gap is a distance between a respective leading edge of at least two of the plurality of items.

6. The conveyor system of claim 1, wherein the relative speed of the gapping conveyors is less than a respective speed of the first application conveyor and the second applicator conveyor.

7. The conveyor system of claim 1, further comprising at least one printer conveyor downstream from the second applicator conveyor.

8. The conveyor system of claim 1, further comprising at least one transportation conveyor between a respective one of the plurality of gapping conveyors and the skew conveyor, the transportation conveyor configured to transport at least one item from the respective one of the plurality of gapping conveyors.

9. The conveyor system of claim 1, wherein each of the plurality of gapping conveyors comprises a light emitter positioned at a first location and the photodetector positioned at a second location opposite the first location, wherein the light emitter is aimed at the photodetector.

10. A system comprising:

a first gapping conveyor with a first gap detection system that can detect a gap distance between two items on the first gapping conveyor;

a second gapping conveyor with a second gap detection system that detects a gap distance between the two items on the second gapping conveyor, wherein the second gapping conveyor is downstream from the first gapping conveyor;

a skew conveyor downstream from the second gapping conveyor;

a first applicator conveyor downstream from the skew conveyor, the first applicator conveyor configured to receive a first item and a second item from the skew conveyor;

a second applicator conveyor downstream from the first applicator conveyor, the second applicator conveyor configured to receive the first item and the second item from the first applicator conveyor; and at least one controller configured to adjust a velocity of the first gapping conveyor relative to the second gapping conveyor to maintain a desired gap distance between the first item and the second item, wherein the desired gap distance is less than a distance between a first tamp head and a second tamp head positioned downstream from the first applicator conveyor and the second applicator conveyor.

11. The system of claim 10, wherein the gap distance between the two items on the first gapping conveyor is based upon a distance between a respective leading edge of the two items.

12. The system of claim 10, wherein the first gap detection system and the second gap detection system respectively comprise a light emitter positioned at a first location and a photodetector positioned at a second location opposite the first location, wherein the light emitter is aimed at the photodetector.

13. The system of claim 10, wherein the controller decreases the velocity of the first gapping conveyor relative to the second gapping conveyor when the gap distance between the two items is less than the desired gap distance and increases the velocity of the first gapping conveyor relative to the second gapping conveyor when the gap distance is between the two items greater than the desired gap distance.

14. The system of claim 10, wherein the controller maintains constant the velocity of the first gapping conveyor relative to the second gapping conveyor when the gap distance between the two items is greater than the desired gap distance and greater than a gap ignore threshold.

15. The system of claim 10, further comprising at least one printer conveyor downstream from the second applicator conveyor.

16. The system of claim 15, wherein the at least one printer conveyor transports the first item and the second item to the first tamp head and the second tamp head.

17. The system of claim 10, wherein the desired gap distance is between ten and fifteen percent less than the distance between the first tamp head and the second tamp head.

18. The system of claim 10, wherein the controller is further configured to adjust the velocity of at least one of the first applicator conveyor or the second applicator conveyor to adjust a gap between the first item and the second item to be approximately equal to the distance between the first tamp head and the second tamp head.

19. The system of claim 10, further comprising at least one transportation conveyor between the second gapping conveyor and the skew conveyor, the transportation conveyor configured to transport at least one item from the second gapping conveyor to the skew conveyor.

20. The system of claim 10, wherein the skew conveyor is configured to align an edge of the first item and an edge of the second item along an axis of travel of the first applicator conveyor and the second applicator conveyor.

\* \* \* \* \*